United States Patent [19]

Okano

[11] 4,009,939

[45] Mar. 1, 1977

[54] DOUBLE LAYERED OPTICAL LOW PASS FILTER PERMITTING IMPROVED IMAGE RESOLUTION

[75] Inventor: Yukio Okano, Osaka, Japan

[73] Assignee: Minolta Camera Kabushiki Kaisha, Osaka, Japan

[22] Filed: June 3, 1975

[21] Appl. No.: 583,475

[30] Foreign Application Priority Data

June 5, 1974 Japan .............................. 49-64221

[52] U.S. Cl. .......................... 350/162 SF; 350/166; 358/44

[51] Int. Cl.[2] ....................... G02B 5/18; H04N 9/06

[58] Field of Search ............. 350/162 SF, 314, 166; 358/5, 44–47

[56] References Cited

UNITED STATES PATENTS

| | | | |
|---|---|---|---|
| 2,733,291 | 1/1956 | Kell | 350/162 SF |
| 3,756,695 | 9/1973 | Mino et al. | 350/162 SF |
| 3,768,888 | 10/1973 | Nishino et al. | 350/162 SF |
| 3,910,683 | 10/1975 | Nishino et al. | 350/162 SF |
| 3,911,479 | 10/1975 | Sakurai | 350/162 SF |

*Primary Examiner*—Ronald J. Stern

*Attorney, Agent, or Firm*—Jackson & Jones Law Corporation

[57] ABSTRACT

A double layered optical low pass filter is provided for use in a color video system for monitoring an object scene. The optical filter is designed to optically complement a dichroic stripe filter to prevent the introduction of spurious signals by any interference between luminance and chrominance signals, while at the same time providing a transmittance of high spatial frequency luminance signal to permit an improved image resolution. The optical low pass filter includes a first phase retarding filter layer designed to provide a first spatial frequency response across the visual spectrum and a second phase retarding filter layer designed to provide a second spatial frequency response across the visual spectrum. The combined resultant optical transfer function of the filter layers disclose a cut off of the higher spatial signal components of the primary color design wavelengths of the respective first and second filter layers, while transmitting a higher spatial frequency for the luminance signal to provide the improved image resolution. The specific cut off spatial frequencies of the primary colors and the bandwidth of the luminance signals can be subjectively optimized for any applicable system.

10 Claims, 12 Drawing Figures

DOUBLE LAYERED OPTICAL LOW PASS FILTER PERMITTING IMPROVED IMAGE RESOLUTION

BACKGROUND OF THE INVENTION

1. Field of the Invention

The present invention relates to an optical filter for preventing the introduction of spurious color signals in a video system and more particularly to a double layered optical low pass filter capable of providing an optimum cut off spatial frequency for the primary colors to prevent spurious color signals while passing higher spatial frequency luminance signals to permit an improved image resolution.

2. Description of the Prior Art

In the field of color television camera systems, the use of a color encoding or dichroic filter for modulating the light flux and/or optically converting an object scene into high frequency signals is well known. In color television the transmission of a color picture representative of the object scene requires three independent video signals and various forms of single and double tube camera systems have been utilized such as U.S. Pat. No. 2,733,291 and U.S. Pat. No. 3,378,633.

Various forms of dichroic or color encoding filters have been utilized in the prior art, for example, U.S. Pat. No. 3,771,857 and U.S. Pat. No. 3,860,955. These color encoding filters are placed in the light path of a pickup tube or image tube to separate the light passing through it into primary color component light signals. These light signals are then transformed into an electrical signal after they impinge upon a photosensitive element of the pickup tube. The image plane of the optical system is focussed on the pickup tube and an electron beam scans a raster in deriving the electrical signals.

In addition to the primary color signals generated, the color encoding filters also provide, throughout their grid, areas that are transparent to the primary colors and thus pass a light representative of the brightness of the image. The color signal components and luminance signals can then be electrically separated by circuitry external to the pickup or image tube. The separate signals are then processed in a manner to produce wave forms for direct application to a color receiver or to produce a composite wave form conforming to broadcasting standards for application to a transmitter.

A problem that is recognized in the prior art, is the interference or cross talk between high frequency luminance signals and the chrominance signals. If the object scene contains high spatial frequency components which fall into the chrominance signal band, spurious signals are produced by the interference between the luminance and chrominance signals. These spurious signals can originate for example from stripe patterns in the object scene or from edges in the object scene since the Fourier decomposition of an edge has frequencies in the appropriate range. The decoding scheme in the video system will erroneously interpret these spurious higher spatial frequencies as color information and accordingly incorrect colors will be observed in the reconstruction of the object scene. In addition, strong moire patterns have been observed which are created between the interaction of the color encoding gratings with the gratings produced by the appropriate range of spatial frequencies in the object scene.

Thus, it has been known in the prior art that it is highly desirable to eliminate any beat frequencies and attempts have been made to optically defocuss the optical image formed at the target electrode of the image tube. However, it is desired that the luminance representative signal should have as high a resolution as possible, in order to reproduce the object scene with sufficient detail. By simply optically defocussing the optical image there would be a reduction in the luminance resolution.

One approach to this problem, has been to insert an astigmatic filter having alternate and parallel strips of different transmissivity and having a spatial cut off frequency around the carrier frequency of the lowest frequency color component carrier signal derived from the image tube, see U.S. Pat. No. 3,566,013.

Another approach has been to use a series of birefringement elements that are rotationally mounted within the optical axis of the video system, such as disclosed in U.S. Pat. No. 3,588,224.

Another solution has been to use a symmetrical rectangular wave phase grating so that those spatial frequencies in the object scene which produce a beat interference are filtered out and the problems of color misinformation and moire patterns are eliminated, an example of this type of optical filter can be seen in U.S. Pat. No. 3,681,519.

The use of rectangular wave phase grating which includes a plurality of sets of laminae to attenuate striped diffraction patterns of Fresnel order of a defocussed image and color striped patterns affected by the interference between the color encoding filter and the striped diffraction patterns is disclosed in U.S. Pat. No. 3,768,888 owned by the assignee of the present invention.

An optimized optical low pass filter utilizing phase grating to attain a response to zero in a frequency over a desired cut off frequency while at the same time being independent of the F number of the optical system is disclosed for respectively a rectangular phase grating and a trapezoidal phase grating in U.S. Pat. Nos. 3,756,695 and 3,821,795 also owned by the assignee of the present invention.

Recently, an optical filter which is formed from several randomly distributed parallel grating stripes which overlap each other has been disclosed in U.S. Pat. No. 3,911,479. For simplification, this form of grating with random overlapping distribution is described as a Poisson grating. Purportedly, this filter is capable of providing an integer multiple of phase differences in the green spectrum, as a result of the parallel distribution of the respective grating stripes deposited on the substrate. Each of the respective layers of stripes are aligned parallel to the other stripes and may be either positioned directly on a substrate or actually deposited to physically overlap a previously deposited stripe. The production problems associated with this type of an optical filter can be considerable, since when the grating stripes are overlapped, misalignment can easily occur with a resulting effect upon the phase retardation and grating strip distribution. As can be readily appreciated, the utilization of an optical low pass filter in the television industry may be cost competitive. In the case of a regularly spaced phase retardation grating, the grating space is in the order of 1 mm to 100 $\mu$ and it becomes almost impossible to economically fix the gratings at the desired thickness for the phase retardation stripes by any form of multiple evaporation process.

The desire to provide an economical optical low pass filter that can eliminate spurious signals produced by the interference between luminance and chrominance signals while permitting an improved resolution is still a goal of the prior art.

SUMMARY OF THE INVENTION

The present invention provides a double layered optical low pass filter for use in a color video system for monitoring an object scene. The color video system incorporates a dichroic stripe filter for spatially modulating selected primary colors, such as blue and red, while passing luminance signals representative of the relative brightness of the object scene. The double layered optical low pass filter includes a first phase retarding filter layer of a plurality of grating stripes and a second phase retarding filter layer of a plurality of second grating stripes disposed at a nonparallel alignment relative to the first grating stripes. The respective pair of grating filter layers provide a combined optical transfer function (OTF) characteristic of preventing the transmittance of the higher spatial frequency signal components of the respective primary colors while at the same time transmitting components of the luminance signal at spatial frequencies above the cut off frequency of the primary colors. For example, luminance signals in the green region can be transmitted at a relatively high OTF value at spatial frequencies above the cut off frequencies of the blue and red regions. As a result of the double layered low pass filter of the present invention, spurious primary colors not representative of the object scene are prevented while higher spatial frequency luminance signals are transmitted and are thereby capable of providing an improved image resolution.

Both the first and second filter layer gratings satisfy the following equation;

$$1 - 0.65 \frac{\chi}{a} \leq \text{Cos}\ \delta \leq 1 - 0.35 \frac{\chi}{a}$$

wherein for both layers respectively, $\chi$, is the grating width, $a$, is the laminar width and $\delta$ is the phase retardation.

Finally, the relation of the area ratio and phase difference maintains the response, P, over the cut off frequency equal to or between −0.3 and +0.3.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

DESCRIPTION OF THE PREFERRED ENMBODIMENTS

Figure 1:
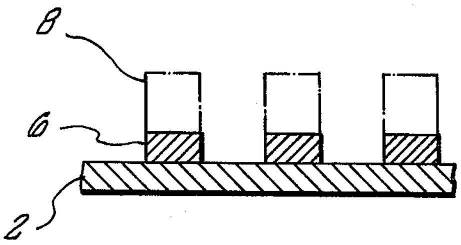
FIG. 1 is a schematic cross sectional view of a parallel overlapping rectangular phase element disposed on a transparent base plate.

The following description is provided to enable any person skilled in the optical design and video transmission art to make and use the invention and it sets forth the best modes contemplated by the inventor of carrying out his invention. Various modifications, however, will remain readily apparent to those skilled in the above arts, since the generic principles of the present invention have been defined herein specifically to provide a relatively economical and easily manufactured double layered optical low pass filter.

The optical low pass filter of the present invention is specifically designed to be utilized for the modification or attenuation of spatial frequency in an object scene image as it passes through a single or double tube color camera system to be focussed on an image scanning device. Image scanning device, may for example, comprise an image orthicon pickup tube or vidicon having a photoelectric surface onto which an object image is focussed. U.S. Pat. No. 2,733,291 is an example of a single tube color camera of the general type herein described.

A color encoding filter or dichroic filter such as U.S. Pat. No. 3,771,857 or U.S. Pat. No. 3,860,955 is positioned between the object scene and the camera's photoelectric surface target and is responsible for the generation of selected high frequency energy distributions as the beam scans the filtered images. As is well known, the dichroic or absorption type stripe color filters selectively pass and block light from an object scene to the photoelectric surface target and thereby provides actual modulation of selected primary color images which will be respectively seen as striped patterns on the camera tube target. The primary color or chrominance signals are further supplemented by a light intensity or luminance signal. The resultant primary color component and luminance signals may then be electrically separated by appropriate frequency filters and circuitry external to the pickup or target tube. Separate signals are then processed in a manner to produce wave forms for direct application to a color receiver or to produce a composite wave form conforming to broadcasting standards for application to a transmitter.

As is well known in the prior art, if the object scene contains high frequency components which fall into the chrominance signal bands, then spurious signals are produced by the interference between the luminance and chrominance signals. Since the interference cannot be readily corrected by electrical methods, it becomes necessary to attenuate the highest spatial frequency components of the object scene to prevent the optical cross talk or beats that are created. An optical low pass filter has been utilized successfully in a single-vidicon color television camera. Generally, it is preferable that the optical low pass filter should be a phase filter, which does not diminish the light level in the transmitted light. In addition, it is desirable that the optical low pass filter be somewhat independent of any variation of the F number of the optical system.

The attenuation of the higher spatial frequency components of the transmitted light from the object scene has been the general solution to the optical cross talk or beat interference problem between the luminance and chrominance signals.

The resultant blur or defocussed primary color images on the target tube are still well within acceptable tolerances for a video system. This provision however of a cut off spatial frequency point, will also diminish the higher spatial frequencies of the luminance signals which accordingly will diminish the resolution capabilities of the video system. The present invention however, is capable of providing independent spatial cut off frequencies for two or more primary colors while at the same time providing a transmission of higher component spatial frequencies in the luminance signal, such as for example, across the green spectrum when red and blue are chosen as the primary colors.

As can be appreciated, by those skilled in the art, the individual parameters of the double layered optical low pass filter of the present invention, can be subjectively varied to match the specific design characteristics of the video system. For example, the angles of the color encoding strips, the direction of the double layered optical low pass filter and the focus or image surface of the target tube are some of the variable parameters that affect the particular subjective design values of the present invention.

Figure 2:
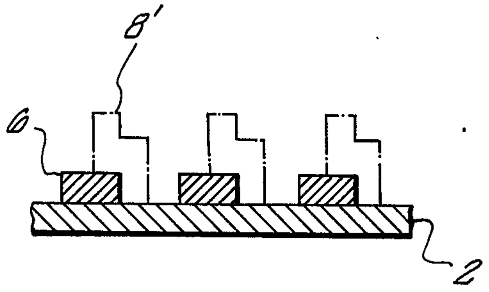
FIG. 2 is a schematic cross sectional view of a parallel partially overlapping double layered filter.
Figure 3:
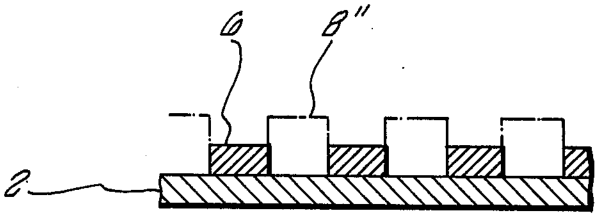
FIG. 3 is a schematic cross sectional view of a parallel double layered optical filter covering the substrate.

To provide an appreciation of the double layered optical low pass filter of the present invention, reference is made to the cross sectional profile views of filters represented in FIGS. 1, 2 and 3. These respective filters are examples of the possible results that can occur with a slight difference in evaporation processes. In this regard, FIG. 1 dicloses a relatively transparent substrate 2 having a first layer of spaced gratings 6 with a second layer 8 deposited in an overlap parallel arrangement. FIG. 3 discloses an overlap second layer 8″ deposited in a parallel but intraspaced manner between the first layer gratings 6. FIG. 2 discloses a common problem wherein the second layer 8′ has been slightly misaligned and is half on the first layer grating 6 and half on the substrate 2. This misalignment is particularly acute in the case of regularly spaced phase retardation gratings wherein the grating space is in the order of 1 mm to approximately 100 $\mu$. The production of a multiple grating at a definite phase retarding thickness with a multiple evaporation process is particularly difficult.

Figure 4:
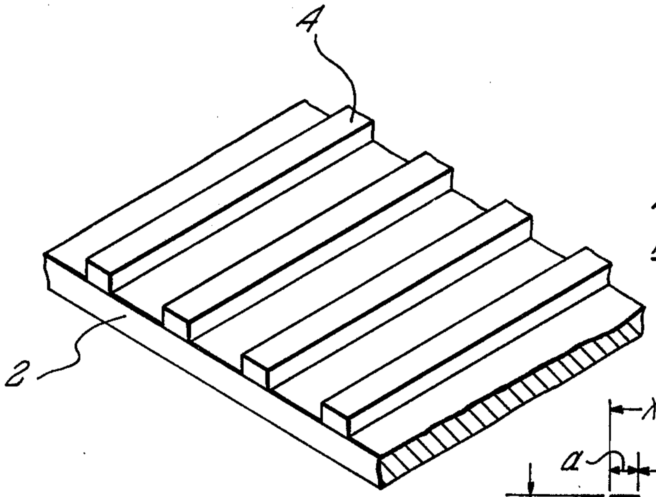
FIG-4 PRIOR ART
FIG. 4 is a perspective view of a prior art optical low pass filter, such as disclosed in U.S. Pat. No. 3,756,695.
Figure 5:
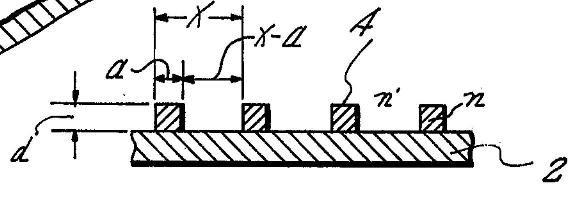
FIG-5 PRIOR ART
FIG. 5 is a cross sectional profile of a rectangular wave phase grating such as the type disclosed in U.S. Pat. No. 3,756,695.

FIGS. 4 and 5 disclose a prior art rectangular wave grating and provides some background theory that is relevant to the present invention. In this regard, reference is made to the U.S. Pat. Nos. 3,756,695 and 3,821,795 and also the article "Optical Low-Pass Filter for a Single-Vidicon Color Television Camera", by Mino and Okano, Journal of the SMPTE, Volume 81, Page 282 (1972), these materials are specifically incorporated herein to supplement the present disclosure.

Referring specifically to FIGS. 4 and 5, the profile view of the rectangular wave phase grating includes a plurality of gratings or laminae 4 deposited on a relatively transparent base plate 2 at the same period, X. The width of the laminae is, *a*, and the geometrical thickness is, *d*.

The material of the substrate and of the grating are transparent and for example can be a glass substrate with magnesium fluoride evaporated on the substrate to form the rectangular wave phase grating 4.

For simplicity, the rectangular wave phase grating is assumed to be placed in the pupil of an aberration free optical system. Since the pupil function of the optical system is modulated periodically by this grating, the line spread function (LSF), defined as the irradiance distribution in the image plane of a line source, becomes discrete. The optical transfer function (OTF), can be derived from the Fourier transform of the LSF and is plotted in FIG. 6 as a triangular-wave periodic function on a graph having coordinates of the optical transfer function value versus the spatial frequency. The OTF value decreases linearly with increasing frequency up to the cut off frequency, *f*, given by $$f = \frac{a}{\lambda b} \qquad (1)$$

where *a* is the laminae width, *b* is the focal length or distance from the grating plate to the focus and λ is a wavelength of light.

Figure 6:
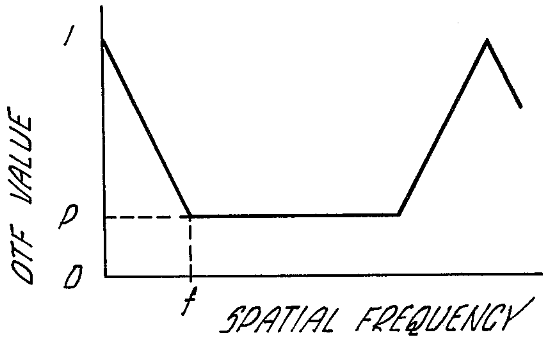
FIG. 6 is a graph of the optical transfer function value versus the spatial frequency for the rectangular wave phase grating of FIG. 5.

As can be seen from FIG. 6 to the *dc* level, P, of the OTF is related to the zero order spectrum of the LSF and is determined by the following equation;

$$P = 1 - \frac{2a}{X}(1 - \cos\delta) \qquad (2)$$

wherein λ is the grating spacing and the δ is the phase retardation given by laminae.

If the refractive index of the laminae is, *n*; the index of refraction of the medium, for example air, is *n′*, (*n′* = 1, in the case of air) and *d* is the geometrical thickness, the phase retardation δ is given by $$\delta = \frac{2\pi}{\lambda}(n - n')\,d \qquad (3)$$

The response curve of a grating with a laminae width of *x-a* would be the same as one with the laminae width of, *a*, and accordingly, the effect of both of these gratings will be the same. It is to be noted that the subsequent disclosure will be made hereinafter as to the laminae width *a*, but that the same will be applicable for the width *x-a*.

The gain, P, of the single layered rectangular wave phase grating is as can be seen from equations (2) and (3) a function of the wavelength λ and thus its cut off characteristic varies with the wavelength λ. If the value, P, falls however, between −0.3 ≦ P ≦ +0.3 then the grating may be used as an optical low pass filter. This condition can be obtained, if the period, phase retardation and laminae width satisfy the following equation;

$$1 - 0.65 \frac{\chi}{a} \leq \cos\delta \leq 1 - 0.35 \frac{\chi}{a} \qquad (4)$$

Figure 7:
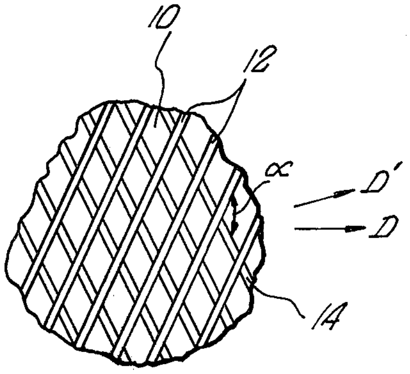
FIG. 7 is a plan view of the double layered optical low pass filter of the present invention.

Referring to FIG. 7, the double layered optical low pass filter 10 of the present invention is disclosed in a plan view having a first phase retarding grating layer 12 and a second phase retarding grating layer 14 crossing the first layer at an angle $\alpha$. The parameters of the present invention have been numerically calculated by the use of a two dimensional Fourier transform, the results of the numerical calculation provide the total gain, $P_D$, along a directional axis D which bisects the angle $\alpha$ and can be set forth as follows;

$$P_D = P_1 + P_2 \qquad (5)$$

wherein $P_1$ and $P_2$ are the gains of the first and second gratings respectively.

Previously, optical filters having a pair of gratings which cross each other have provided a cut off characterstic across the entire frequency range. However, by using crossed individual phase gratings with respective different cut off characteristics, an optical double layered low pass filter with variable frequency cut off characteristics can be obtained.

It has been found that in order to achieve these results each individual grating must however satisfy equation (4) above.

Figure 8:
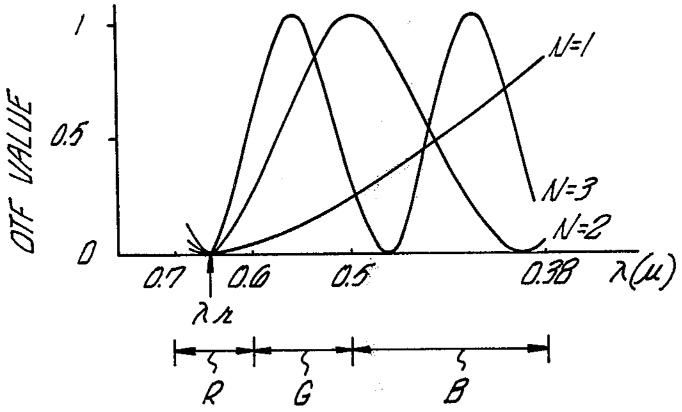
FIG. 8 is a graph of the optical transfer function value versus wavelength for various values of phase retardation for the first grating of FIG. 7 with a design wavelength in the red spectrum.

As can be seen from equation (2), P is a Cosine function and the gain of P with a grating having a ration $a/\chi$ = ¼is disclosed in FIG. 8 wherein $\delta$ becomes $\delta = \pm(2N-1)\pi$ in the red spectrum with a design wavelength of $\lambda_R = 0.66\mu$. The coordinates of FIG. 8 are the optical transfer function value versus the wavelength with the primary color spectrum R = Red, G = Green and B = Blue set forth below wavelengths. In this regard, several values of phase retardation are given for N = 1, 2 and 3. As can be seen, this grating layer will have a characteristic of a high frequency cut off response in the red region.

Figure 9:
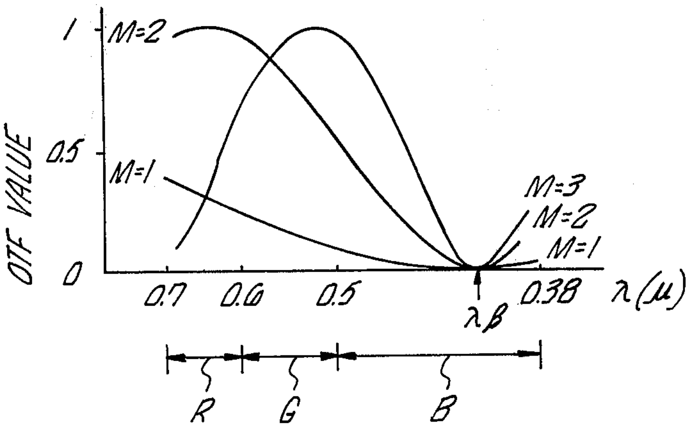
FIG. 9 is a graph of the optical transfer function versus wavelength for various phase retardation values of the second grating layer of FIG. 7 with a design wavelength in the blue spectrum.

FIG. 9 plots a similar graph of the optical transfer function value with $a/\chi$ = ¼ for a grating layer with a blue design wavelength $\lambda_B = 0.41\mu$. Again, $\delta$ becomes $\delta = \pm(2M-1)\pi$ in the blue region with various phase retardation values being plotted such as M = 1, 2 and 3. As can be seen from the filter grating layer illustrated in FIG. 9, this layer is effective in cutting off the spatial frequency in the blue spectrum. As can be seen from both FIGS. 8 and 9 the individual grating layers P value depends upon the phase retardation factor and its value is always less than one. Accordingly, if two different grating layers are overlapped and one grating layer has a high cut off response in the red spectrum while the other grating layer has a high cut off response in the blue spectrum the total gain $P_D$ in both the blue spectral region $\lambda_B$ and the red spectrum region $\lambda_R$ will always fall within −0.3 ≦ $P_D$ ≦ +0.3 the respective gain of the grating layer with an effective cut off in the red spectrum will be less than one in the blue spectrum region and vice versa with respect to a grating layer with an effective cut off in the blue spectrum.

In accordance with the principles of the present invention, by overlapping two filter phase grating layers within the above described parameters, an optical double layered low pass filter having a spatial cut off frequency response designed to prevent the formation of spurious signals in the selected primary color frequency ranges will be provided. The optical filter 10 will not only cut off the undesirable high spatial frequency components in the primary colors it will at the same time provide several response characteristics which can be subjectively chosen for the green spectrum region. As can be readily appreciated, an important component of the total luminance signal which provides resolution to the image reproduction lies in the green spectrum.

While the red, blue and green primary color system is the one most encountered in the video art, it should be realized however that other color systems, such as cyan, yellow and magenta could also be utilized. Accordingly, it should be realized that the present invention should not be limited to a red, blue and green primary color arrangement and can quite readily be applied in any other color system wherein certain wavelengths must be selectively filtered in the manner and for the purposes described herein.

Figure 10:
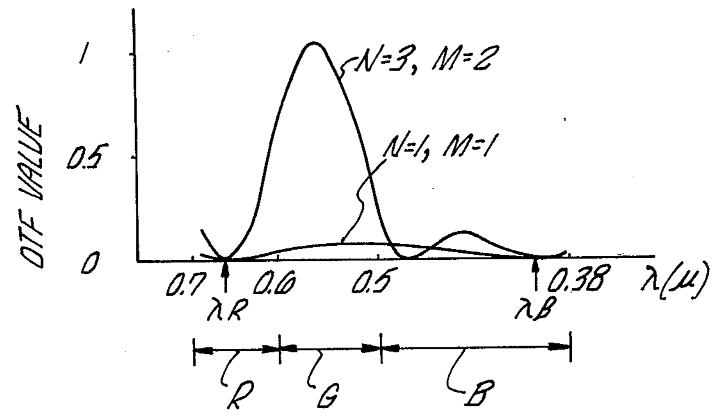
FIG. 10 is a graph of the optical transfer function values for the combined optical effect of the first and second grating layers disclosed in FIGS. 8 and 9.

The combined optical transfer function value versus wavelength for the double layered optical low pass filter of the present invention is shown in FIG. 10 wherein different phase retardation values are selected such as N = 3 and M = 2 to provide a high gain or spatial frequency transmission value for the green region and a phase retardation value of N = 1, M = 1 to provide a spatial frequency cut off characteristic between the blue and red primary color spatial cut off values.

Figure 11:
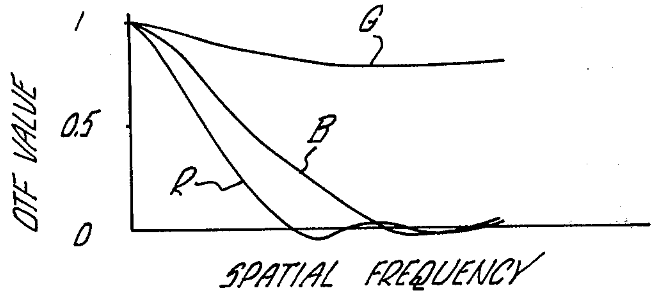
FIG. 11 is a graph of the optical transfer function value versus the spatial frequency for a preferred embodiment of the present invention.

The highly advantageous gain $P_D$ in the green spectrum region for the double layered gratings with a phase retardation value N = 3, M = 2 is disclosed in FIG. 11. FIG. 11 shows the numerical calculation of the spectral response of N = 3, M = 2, wherein the higher spatial frequencies of the primary colors red and blue are cut off so that the amplitude of the high frequency luminance signals will not interfere or cross talk into the chrominance signals. At the same time, the non-interfering high frequency signals in the green region will not be diminished and an improved resolution can be provided.

Figure 12:
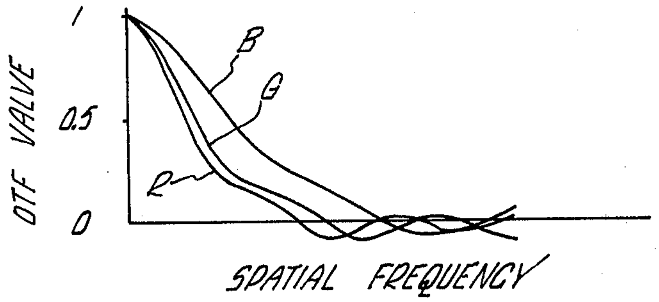
FIG. 12 is a graph of the optical transfer function value versus the spatial frequency for another embodiment of the present invention.

FIG. 12 discloses the numerical calculation of the spectral response plotted as a function of the optical transfer function value versus the spatial frequency for N = 1, M = 1. In this regard, a double layered optical low pass filter embodiment is provided with uniform cut off frequencies at a fairly concise point across the entire visual spectrum.

As can be readily appreciated, if each filter layer of gratings satisfy equation (4) above, with one layer having a design wavelength in the red region ($\lambda_R = 0.6\ \mu \sim 0.7\mu$) and the other in the blue spectrum ($\lambda_B = 0.38\ \mu \sim 0.5\mu$), the actual value of the gain $P_D$ for the green spectrum region maybe chosen at will to optimize the resolution characteristics of the specific video system.

For example, if a double layered optical low pass filter has a grating with $a \pm 3\pi$ phase factor and a ratio $a/\chi$ = ¼ with a respective filter layer design wavelength $\lambda_R = 0.66\ \mu$ and $\lambda_B = 0.42\ \mu$, the cut off spatial frequency for the green spectrum will fall in between the previous two embodiments of the present invention plotted respectively in FIGS. 11 and 12.

The cut off frequency of a single layered gratings is inversely proportional to $\lambda$ as disclosed in equation (1).

Accordingly, the spatial cut off frequency of the blue spectrum is higher than that of the red spectrum. With the double layered optical low pass filter of the present invention, an opportunity is provided to choose the spatial cut off frequency of each primary color independent of the other primary color. This can be accomplished by changing the lamina width of the blue and red grating layers while maintaining constant the distance from the gratings to the focal point. For example, if both gratings in the first and second layers satisfy the ratio, $a/\chi = 1/4$ and if the lamina width of the blue spatial frequency cut off grating is to be ⅔ the width of the red spatial frequency cut off grating width, then the spatial cut off frequencies in both the blue and red spectrums may be made equivalent. Other parameters can be varied to achieve the same results, for example, if it is desired to use the same lamina width on both the first and second layer gratings, it would be possible to vary the angle between D shown in FIG. 7 such as in a direction, D', and also the scanning direction of the raster to accomplish a change in the effective lamina width. In each of the previous examples, the first and second grating layers were overlapped on the same substrate and thereby the parameter, *b*, the distance from the grating plate to the focus point was fixed however, it should be appreciated that it is possible to place the two gratings on separate substrates and at separate positions. Accordingly, by changing the value, *b*, that is the distance from the individual grating to the focal point an additional parameter of freedom is provided for selecting the cut off frequency in the present invention.

In addition, the previous examples were explained in relationship to a rectangular wave phase grating. It is possible however to further eliminate the higher order spectra which produce flare or low contrast image in a video system by providing the strips of the phase gratings with side surfaces that are inclined to the substrate. In this regard, phase gratings, such as trapezoidal, triangular and sinusoidal wave phase gratings can be utilized. The effective lamina width of these gratings must be made equivalent to that of the rectangular wave grating. The effective lamina width of, for example, a triangular wave grating refers to the average value width of the lamina section.

A phase grating filter of a random lamina width will be equivalent to that of a rectangular wave grating if P in the above equation (2) is set as $$P = \left| A_o + (1 - A_o) e^{i\delta} \right|^2 \qquad (6)$$

In the above equation, $A_o$ is the area of the filter absent the grating. If the average lamina width, $\bar{a}$, is replaced with, $a$, from equation (1) above, the equation is exactly equal to that of a Poisson grating. In order for the Poisson grating to be applicable to an optical double layered low pass filter having crossed gratings, it is necessary that the gain, (P) be greater than or equals 0.3 absolute for each Poisson grating. Accordingly, it is possible for the present invention to provide a double layered low pass filter having either both random wave gratings for each layer or the combination of a regularly spaced grating layer with a randomly spaced grating layer.

As can be readily appreciated by those skilled in the art, the material of the individual phase grating layers forming the double layered optical low pass filter of the present invention, can be selected from a number of materials or combinations of materials and the following examples should not be considered as limiting, magnesium fluoride, silicon oxide and titanium oxide. The actual relative angle between the first and second grating layers can vary within the parameters of the present invention but it has been found that an angle between 90° and 160° has provided the optimum results.

It should be readily appreciated that variations of the present invention can be readily accomplished by those skilled in the art in accordance with the teachings herein and accordingly the scope of the present invention should be measured solely from the following claims, in which I claim:

What is claimed is:

1. An optical low pass filter for use in a color video system for monitoring an object scene having a color encoding striped filter for spatially modulating at least two selected primary color signals while passing a third luminance signal at a higher spatial frequency comprising:

a first phase retarding filter layer; and a second phase retarding filter layer, and respective filter layers including a plurality of phase retarding grating stripes, the respective first and second stripes having a nonparallel alignment relative to each other and providing a combined optical transfer function value characteristic of preventing the transmittance of the high spatial frequency signal components of the two selected primary colors while transmitting luminance signals at spatial frequencies above the cut off frequencies of the primary colors, the nonparallel grating stripes preventing spurious primary color signals not representative of the object scene while higher spatial frequency luminance signals are transmitted to provide an improved image resolution.

2. The invention of claim 1 wherein both the first and second filter layers satisfy the following equation;

$$1 - 0.65 \frac{\chi}{a} \leq \cos \delta \leq 1 - 0.35 \frac{\chi}{a}$$

wherein for both layers respectively, $\chi$ is the grating width, $a$ is the lamina width and $\delta$ is the phase retardation.

3. The invention of claim 2 further including a substrate supporting the first and second layers and the phase retardation $\delta$ of the respective first layer, $\delta_1$, and the second layer $\delta_2$ are as follows:

$$\delta_1 = \frac{2\pi}{\lambda_1} (n_1 - n') d_1$$

$$\delta_2 = \frac{2\pi}{\lambda_2} (n_2 - n') d_2$$

wherein $\lambda_1$ and $\lambda_2$ are the design wavelengths for the particular primary colors; $n_1$ and $n_2$ are the indices of refraction for the respective first and second layers; $n'$ is the index of refraction for the medium and $d_1$ and $d_2$ are the geometrical thicknesses of the phase retardation for the first and second gratings.

4. The invention of claim 1 wherein one of the filter layer stripes have a random lamina width across the grid.

5. The invention of claim 1 wherein the lamina width of the first and second phase retarding filter layers are of a different dimension.

6. The invention of claim 1 wherein the first and second filter layers are positioned at different relative distances to the plane of the color encoding striped filter.

7. The invention of claim 1 wherein the first phase retarding filter layer attenuates the red spectrum and the second phase retarding filter layer attenuates the blue spectrum, the first and second filter layer stripes cross within an angle of 90° to 160°.

8. The invention of claim 7 further including a substrate supporting the first and second layers and the phase retardation $\delta$ of the respective first layer, $\delta_1$, and the second layer $\delta_2$ are as follows:

$$\delta_1 = \frac{2\pi}{\lambda_1}(n_1 - n')\, d_1$$

$$\delta_2 = \frac{2\pi}{\lambda_2}(n_2 - n')\, d_2$$

wherein $\lambda_1$ and $\lambda_2$ are the design wavelength for the particular primary colors; $n_1$ and $n_2$ are the indices of refraction for the respective first and second layers; $n'$ is the index of refraction for the medium and $d_1$ and $d_2$ are the geometrical thicknesses of the phase retardation for the first and second gratings.

9. An optical low pass filter for use in a color video system for monitoring an object scene having a color encoding filter means for spatially modulating at least two selected primary colors while passing luminance signals representative of relative light intensity comprising;

a first phase retarding grating; and a second phase retarding grating, the respective gratings having a nonparallel alignment relative to each other, the design parameters of each grating relating to a respective primary color and providing a combined optical transfer function characteristic of cutting off the higher spatial frequency signal components of the primary colors while transmitting luminance signals having spatial frequency components above the cut off frequency of the primary colors, the respective first and second filter layers satisfy the following equation;

$$1 - 0.65\frac{\chi}{a} \leq \cos\delta \leq 1 - 0.35\frac{\chi}{a}$$

wherein for both layers respectively, $\chi$ is the grating width, $a$ is the lamina width and $\delta$ is the phase retardation, the lamina width for at least one grating being random across the grid.

10. The invention of claim 9 further including a substrate supporting the first and second filter layers and satisfying the following equations;

$$\delta_1 = \frac{2\pi}{\lambda_1}(n_1 - n')\, d_1$$

$$\delta_2 = \frac{2\pi}{\lambda_2}(n_2 - n')\, d_2$$

wherein for both layers respectively, $\chi$ is the grating width; $a$ is the lamina width, $\delta_1$ is the phase retardation for the first layer; $\delta_2$ is the phase retardation for the second layer; $\lambda_1$ and $\lambda_2$ are the design wavelengths for the selected primary colors; $n_1$ and $n_2$ are the indices of refraction for the respective first and second layers' $n'$ is the index of refraction for the medium and $d_1$ and $d_2$ are the geometrical thicknesses of the phase retardation for the first and second gratings.

* * * * *

UNITED STATES PATENT AND TRADEMARK OFFICE

CERTIFICATE OF CORRECTION

PATENT NO. : 4,009,939

DATED : March 1, 1977

INVENTOR(S) : Yukio Okano

It is certified that error appears in the above-identified patent and that said Letters Patent are hereby corrected as shown below:

Col. 4, line 40 delete "modification" and insert --modulation--.

Col. 10, line 24 delete "and" and insert --the--.

Signed and Sealed this

Third Day of May 1977

[SEAL]

*Attest:*

RUTH C. MASON
*Attesting Officer*

C. MARSHALL DANN
*Commissioner of Patents and Trademarks*